UNITED STATES PATENT OFFICE.

LUDWIG HAECKER, OF ALTENBURG, HUNGARY.

IMPROVEMENT IN BREWING WHEN INDIAN CORN IS USED.

Specification forming part of Letters Patent No. 35,752, dated July 1, 1862.

*To all whom it may concern:*

Be it known that I, LUDWIG HAECKER, of Altenburg, in the Kingdom of Hungary, have invented a new and useful Improvement in Brewing; and I do hereby declare that the following is a full, clear, and exact description of the same.

The object of this invention is to employ Indian corn or maize, mixed together with barley in certain proportions, for the purpose of brewing beer by a simple process, as will be hereinafter more fully described, which requires no expensive machinery, and which can easily be introduced into any brewery, old or new.

To enable those skilled in the art to fully understand and use my invention, I will proceed to describe it.

The proportion in which the maize and barley are mixed, is about forty per cent. of the former to sixty per cent. of the latter; but the proportion may be varied according to the quality of the malt, the respective prices of barley and maize, and the size of the stills.

The malt which I use is of that sort in which the acrospire has reached two-thirds of the length of the grain, while the radicles are not yet feltered, and it ought to be thoroughly torrefied and cleaned by a suitable and effective machine. The maize is employed in the shape of groats, and for extra-fine beers the shells are sifted off. No complicated process—such as malting, or steeping, or kiln-drying without malting—is required. In fact, by the application of such processes all attempts to use a certain percentage of maize in brewing heretofore made have failed. The best manner to prepare the maize is by bruising or crushing the same, first between rollers, and pass it afterward through the millstones. When dried out too much it does not grind well, and in midsummer, when the maize is very dry and becomes heated under the stones, the wort sometimes does not run freely from the mash-tun. For these reasons maize that has become very dry is moistened about twelve hours before grinding with about seven per cent., by weight, of water. The smallest possible time ought to intervene between the period when the maize is ground and when it is used. By observing all these measures, the worts of maize-beer run easy and clear, and no tedious additions of some material for starting up the grounds is required.

This method of brewing has some resemblance with that commonly practiced in Vienna for malt beers. Maize-beer can be produced without any other apparatus than the ordinary copper, no boiler, nor stew, nor mash-tun being required for maize. The groats of maize are simply mixed with cold water to a paste, and in this state introduced into the first thick-mash boiling, or, if the quantity is too great to be worked at once in the copper, it is divided to the first and the second thick-mash boiling; or, instead of this and according to my improved process, the groats of maize, with or without the addition of malt, are put in the stew and mash-tun, and mixed into a thick paste by adding about two and one-half per cent., by weight, of water, and heated with steam to about 100° to 105° Fahrenheit, when the mixture runs into the copper to the first thick-mash boiling.

In operating with large quantities it is advisable to divide the mass in two boilings to prevent burning, and in this case two-thirds of the mash of maize run to the first and one-third to the second thick-mash boiling.

In order to render my process perfectly intelligible, I will give an example of a brewing of thirty-six barrels, the time for beginning the operation being arbitrary, assumed at eight o'clock forty minutes a. m. It must be remarked, however, that all measures regarding the quantity of water and mash in the copper and mash-tun are more or less variable not only in winter and summer, but from one day to the other, even according to the changes in the weather and temperature.

The operation of steaming the maize commences at eight hours forty minutes a. m., the mashing at nine, and the duration of the first mashing is fifty minutes. If two thick-mash boilings are made, each boils about ten minutes. If only one is made, it is kept boiling for thirty minutes. The thin mash boils from forty-five minutes to one hour. The state of rest begins at one p. m., the running from the mash-tun at one hour forty-five minutes, the running of the second wort at three p. m. Hops are added at four; the end of boiling with hops at eight. The hops are then kept boiling for three to four hours.

The proportion in which the water and other ingredients are used is as follows: At the beginning the stew and mash-tun for maize contains 10.5 barrels of water; the copper, 10.7 barrels of water; the mash-tun, 29.4 barrels of water. Mash is drawn in the copper for boiling for the first thick mash 18.5 barrels; second mash, 18.5 barrels. If only one thick mash is made, the quantity drawn in the copper is 24.2 barrels; for the thin mash, 24.2 barrels; quantity of first wort in copper, 30.33 barrels; quantity of after wort, eighteen barrels. The difference of water for the second wort is effected by means of the scotch sparger, which is indispensable to produce good work. The water must be as hot as possible.

The temperatures during the different stages of the operation are as follows:

| | If the quantity of maize is below 40 per ct. | If the quantity of maize is more than 40 per ct. |
|---|---|---|
| If two thick-mash boilings are made— | | |
| After the 1st mashing.. | 100° to 104° | 100° to 104° |
| After the 2d mashing.. | 120° to 130° | 120° to 130° |
| After the 3d mashing.. | 156° | 156° |
| After the 4th mashing. | 167° to 170° | 165° to 167° |
| If only one thick-mash boiling is made— | | |
| After the 1st mashing.. | 100° | 100° |
| After the 2d mashing.. | 150° | 150° |
| After the 3d mashing.. | 167° to 170° | 165° to 167° |

During the hot season the wort runs from the cooler through a suitable cooling apparatus, which may consist of a wooden box provided with a series of serpentine pipes and filled with ice. Besides this, the temperature of the fermenting wort is regulated by floating cylinders of tinned sheet-iron constantly supplied with fresh ice. By these means a regular and gradual fermenting process is effected and the desired clearness and low temperature for cellaring is attained.

From this description it will be seen that the fermenting and the cellaring process for maize-beers is essentially the same as that followed at the great breweries in Vienna and Munich for pure malt-beers.

In following my process practical brewers will be able to produce maize-beers ready for consumption after a fortnight, or which will keep in cool cellars for months. In fact, the observations with the saccharometer at cellaring and during the principal fermenting process show that pure malt-beers have a greater tendency for advancing or souring than maize-beers brewed according to my process.

I do not claim broadly the employment or use of maize for brewing beer, such having been previously attempted; but,

Having thus described my invention, what I claim as new, and desire to secure by Letters Patent, is—

The within-described process of producing maize-beers by treating maize mixed with barley or malt about in the proportion and substantially in the manner set forth.

LUDWIG HAECKER.

Witnesses:
   D. SPECKER,
   AR. GONHENBACHER.